Aug. 27, 1963   C. N. SHOWALTER   3,101,827
HIGH SPEED PLANTER CLUTCH
Filed March 29, 1962   3 Sheets-Sheet 1
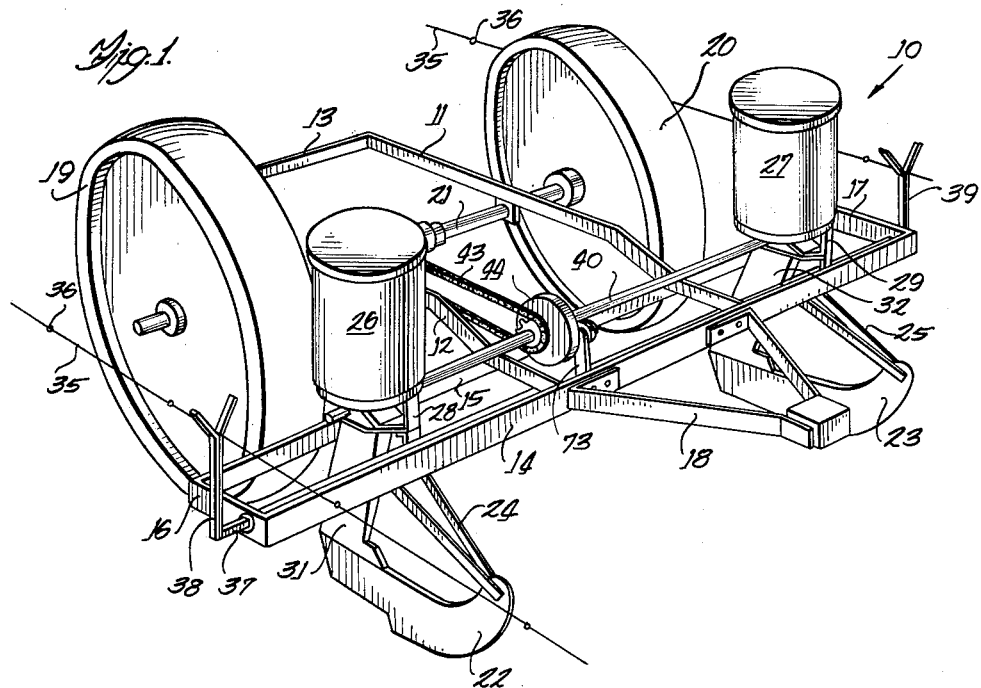
Inventor
Carl N. Showalter
Paul O. Pippel
Attorney

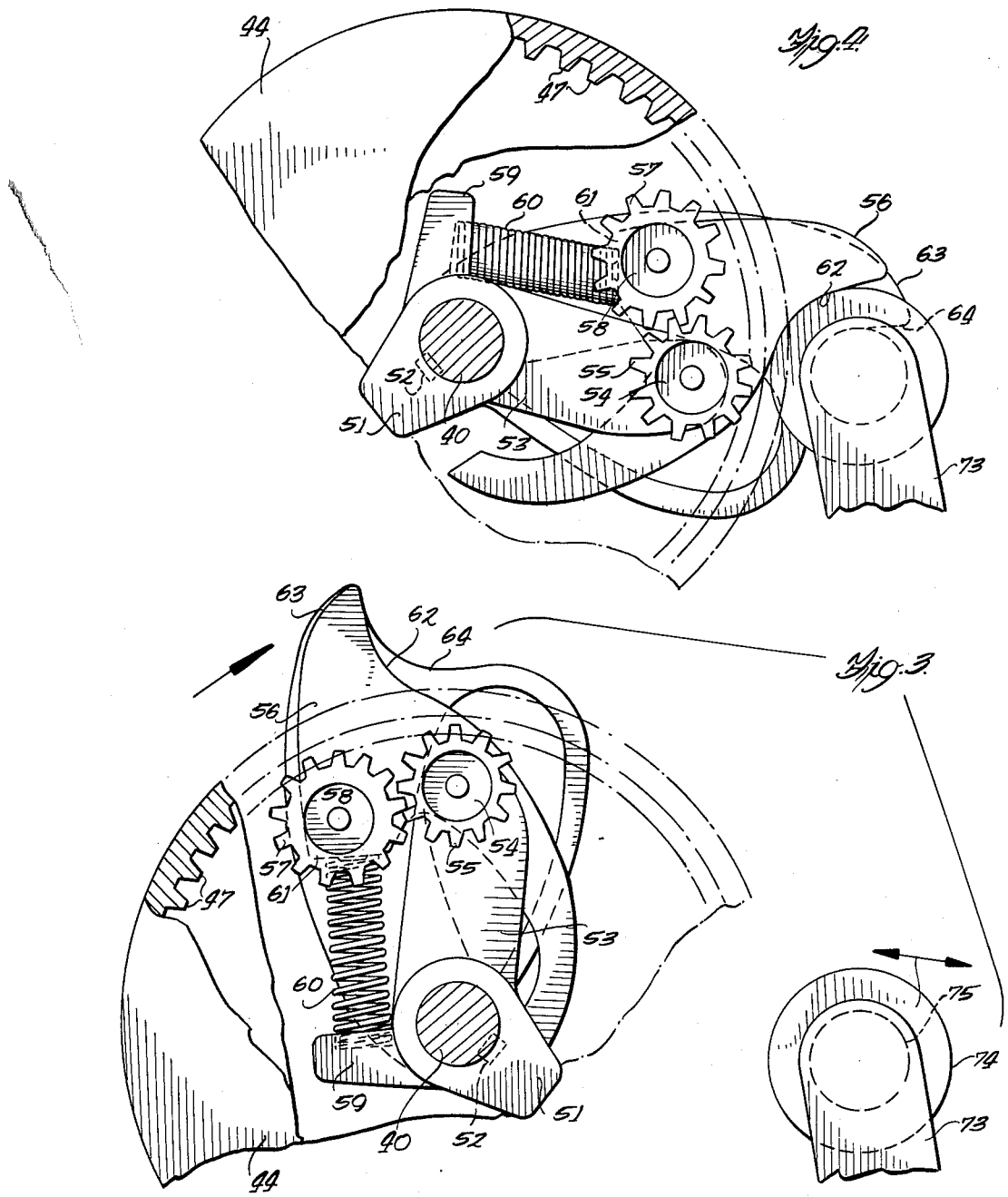

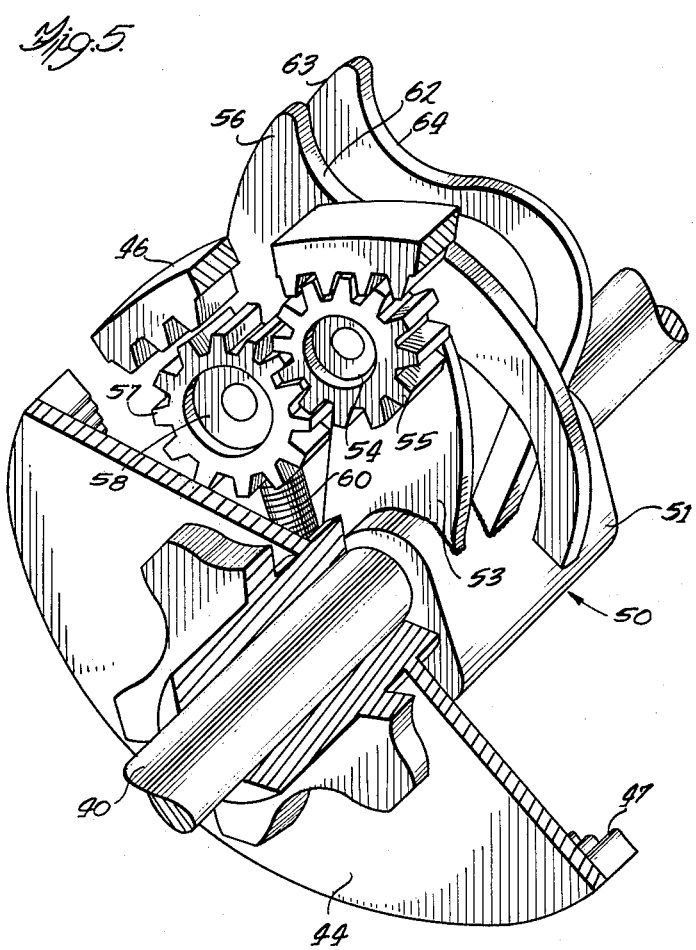

United States Patent Office 3,101,827
Patented Aug. 27, 1963

3,101,827
HIGH SPEED PLANTER CLUTCH
Carl N. Showalter, Westmont, Ill., assignor to International Harvester Company, Chicago, Ill., a corporation of New Jersey
Filed Mar. 29, 1962, Ser. No. 183,544
6 Claims. (Cl. 192—23)

This invention relates in general to agricultural implements, and more particularly to a new and improved clutch for a high speed check row planter.

Check row planting is a well known method of planting whereby hills or groups of seeds are deposited in the ground at regularly spaced intervals. The chief advantage of this method is that a field so planted may be cross cultivated thereby permitting greater weed control. To carry out this method, it has been the practice to fix a wire to the ground, "knotted" at intervals corresponding to the hill spacing. As the check row planter traverses the field, a check fork mounted on an oscillating check shaft engages the knot to trip the check shaft, actuate the clutch, and thereby eject the seeds into the seed boot. To deposit the desired amount of seed to the seed boot valve however, requires that the speed plate be rotated for a span of time relatively short compared to the time span of the hill dropping cycle. With the advent of higher planter speeds, it has been found necessary to provide an extremely positive clutch to effectively meter the seed. Prior art devices have failed to fulfill this need.

An object of the present invention is to transmit intermittent rotary motion to a driven shaft from a constantly rotated driving member.

Another object of the invention is to provide a planter drive which is responsive to external actuation to positively engage and disengage the clutch.

A further object of the invention is to provide a clutch of simplified design which works with a minimum number of parts to effectively perform the desired function.

Other objects and advantages of the invention will hereinafter become more fully apparent from the following description of the annexed drawings, which illustrate a preferred embodiment of the invention, and wherein:

FIGURE 1 is a perspective view of a two row planter employing the present invention;

FIGURE 2 is a perspective view similar to FIGURE 1, with certain parts broken away for clarity;

FIGURE 3 is a side elevational view of the clutch of the present invention, partly in section, showing the clutch parts in the engaged position;

FIGURE 4 is a side elevational view similar to FIGURE 3 showing the clutch parts in the disengaged position; and FIGURE 5 is a perspective view of the clutch in the disengaged position, with certain parts broken away for clarity.

Referring now to the drawings, wherein like reference characters designate like or corresponding parts throughout the several views, there is shown in FIGURE 1 a check row planter illustrated in its entirety by reference numeral 10. The illustrated planter includes a main frame having fore and aft extending side bar members 11 and 12 joined at their rearward ends by a transversely extending bar 13. The forward ends of side bars 11 and 12 are secured to the frontal member 14 of a substantially rectangularly shaped sub-frame. The sub-frame further includes a rear member 15, and side elements 16 and 17. A hitch structure 18 is mounted on frontal element 14 for securing the planter to a tractor, not shown. Ground wheels 19 and 20 are secured to an axle 21, which is rotatably journalled in main frame side bars 11 and 12.

In the illustrated embodiment, runner type furrow openers 22 and 23 are mounted upon the sub-frame by depending bracket assemblies 24 and 25, respectively. Seed dispensing hoppers 26 and 27 are mounted on the frame in substantial vertical alignment with furrow openers 22 and 23 by bracket structure 28 and 29. A seed metering plate 30 is rotatably mounted in each of the seed dispensing hoppers, and is adapted to eject the seed into seed boots 31 and 32 from whence the seed is conveyed into the ground.

Check wires 35 having knotted portions 36 spaced at equal intervals therealong are staked into the ground by means not shown. A check shaft 37 is mounted for oscillating movement in sub-frame side portions 16 and 17. Upstanding Y-shaped check forks are mounted on the projecting ends of check shaft 37. As the planter traverses the field knotted portions 36 engage check forks 38 and 39 to oscillate check shaft 37 and actuate the clutch, as will hereinafter become more fully apparent. Spring means, not shown, are provided for oscillating check shaft 37 from its tripped position back into the knot engaging position. When the clutch is engaged, drill shaft 40 and its associated bevel gear 41 make one complete revolution, thereby rotating seed plate 30 sufficiently to meter out the number of seeds required for a hill.

The drive means for check shaft 40 include a fore and aft extending chain 43 driven by axle 21. A ring gear 44 having a sprocket 45 integral therewith is rotatably mounted on check shaft 40. Sprocket 45 cooperates with chain 43 to impart a continuous rotary motion to ring gear 44. Ring gear 44 includes an annular flange 46 having a plurality of spaced-apart inwardly directed teeth 47 therein.

A clutch assembly 50 is fixedly secured to check shaft 40 adjacent ring gear 44, and is adapted to transmit the rotary motion of ring gear 44 intermittently to check shaft 40. A clutch body 51 is fixedly secured to check shaft 40 by a key 52 or the like.

A first radially extending arm 53 is provided on body 51 in substantial vertical alignment with flange portion 46. A transversely extending shaft 54 is provided at the end portion of arm 53, and has a pinion gear 55 rotatably mounted thereon. The length of arm 53 and diameter of pinion 55 are of such a size as to dispose the pinion 55 in meshing relation with the internal teeth 47 of ring gear 44. Thus it will be understood that as ring gear 44 rotates around check shaft 40, pinion 55 will rotate around shaft 54, and arm 53 will remain stationary with respect to shaft 40.

A second generally radially extending arm 56 is pivotally mounted on shaft 54. A pinion 57 is rotatably mounted on a shaft 58 projecting outwardly from the face of arms 56. Arms 56 is of such a length as to dispose pinion 57 in constant meshing relation with pinion 55, and also to dispose pinion 57 in substantial vertical alignment with flange 46. Body 51 contains an outwardly projecting arm 59 adapted to engage and constrain one end of spring 60. The other end of spring 60 is engageable with a shoulder 61 formed on arm 56, the purpose of which will hereinafter become more fully apparent. Arm 56 is further provided with an arcuate camming surface 62, the purpose of which will hereinafter be set forth in detail.

A third substantially radially extending arm 63 is fixedly secured to body 51 at a point laterally spaced from arm 56. Arm 63 is provided with an arcuately shaped camming surface 64, similar to the arcuate camming surface 62 of arm 56.

Means for actuating the above recited clutch mechanism are mounted upon check shaft 37. As is best seen in FIGURE 2 a sleeve 70 having an upstanding ear 71 is fixed to check shaft 37 at a point substantially aligned with arms 56 and 63. An actuating link 72 is pinned at one end to ear 71 and at the other end to one end of a roller supporting arm 73. Arm 73 is pivoted at an end portion to frame member 14. A roller having a larger diameter portion 74 adapted to engage camming surface 62, and a smaller diameter portion 75 adapted to engage camming surface 64, is mounted at one end of arm 73.

With particular reference to FIGURE 4 and FIGURE 5, it will be noted that when the clutch is in the disengaged position, camming surfaces 62 and 64 are engaging roller portions 74 and 75, thus preventing the clutch body 51 and drill shaft 40 from rotating. When a knot 36 engages check forks 38 and 39, check shaft 37 will oscillate to swing arm 73 and its associated roller out of engagement with arms 56 and 63. Spring 60 will then pivot arm 56 about shaft 54 and bring pinion 57 into engagement with teeth 47. It will be apparent that with pinions 55 and 57 engaging each other and also engaging teeth 47, the pinions will not be free to rotate about shafts 54 and 58, and therefore will follow ring gear 44. Thus, the clutch is engaged and arms 53, 56, and 63, body 51, and drill shaft 40 are integrally locked to, and rotatably with ring gear 44. The rotation of drill shaft 40 will cause a corresponding rotation of seed plates 30, thereby ejecting the seeds into the seed boots.

When the knots 36 pass through check forks 38 and 39, the check forks will oscillate back into an upstanding position and locate the two-diameter roller in the path of travel of arms 56 and 63. When the clutch mechanism makes one complete revolution, the camming surface 62 of arm 56 will then engage roller portion 74. Arm 56 will then pivot about shaft 54, and shoulder portion 61 will depress spring 60 against arm 59. This action will disengage pinion 57 from internal teeth 47, and for an instantaneous period of time there will be no positive drive to check shaft 40. Arm 63 will then engage roller portion 75 to positively lock body 51 and drill shaft 40 from rotation. The clutch is then in the disengaged position, and ring gear 44 rotates freely about drill shaft 40 until a knot 36 once again engages drill forks 38 and 39.

It should be understood, of course, that the foregoing disclosure relates to only a preferred embodiment of the invention, and that numerous modifications or alterations may be made therein without departing from the spirit or the scope of the invention as set forth in the appended claims.

What is claimed is:

1. A drive mechanism for transmitting intermittent power comprising:
   (a) a power transmittal shaft,
   (b) a ring gear rotatably mounted on said shaft,
   (c) means for rotating said ring gear,
   (d) clutch means mounted on said shaft adjacent said ring gear including,
      (1) a first arm secured to and extending substantially radially of said shaft,
      (2) a pinion rotatably mounted on said arm and engaging said ring gear,
      (3) a second arm associated with said first arm and extending substantially radially of said shaft,
      (4) said second arm having a pinion rotatably mounted thereon engaging said first arm pinion and adapted to engage said ring gear to transmit the rotary motion of said ring gear to said shaft,
      (5) means for engaging said second arm pinion and said ring gear, and
      (6) stop means intermittently engageable with said second arm to disengage said second arm pinion from said ring gear and thereby limit the rotation of said shaft to periods of non-engagement of said stop means with said second arm.

2. The invention set forth in claim 1 wherein spring means are associated with said second arm biasing said second arm pinion into engagement with said ring gear during periods of non-engagement of said stop means with said second arm.

3. A drive mechanism for transmitting intermittent power comprising:
   (a) a power transmittal shaft,
   (b) a ring gear rotatably mounted on said shaft,
   (c) means for rotating said ring gear,
   (d) clutch means mounted on said shaft adjacent said ring gear including,
      (1) a body fixedly secured to said shaft,
      (2) a first arm secured to said body and extending substantially radially of said shaft,
      (3) a pinion rotatably mounted on said arm and engaging said ring gear,
      (4) a second arm extending substantially radially of said shaft and pivotally secured to said first arm,
      (5) a pinion rotatably mounted on said second arm engaging said first arm pinion and adapted to engage said ring gear to transmit rotary motion from said ring gear to said shaft,
      (6) spring means biasing said second arm pinion into engagement with said ring gear, and
      (7) stop means intermittently engageable with said second arm to pivot said second arm with respect to said first arm and disengage said second arm pinion from said ring gear against the bias of said spring thereby limiting the rotation of said shaft to periods of non-engagement of said stop means with said second arm.

4. A drive mechanism for transmitting intermittent power comprising:
   (a) a power transmittal shaft,
   (b) a ring gear rotatably mounted on said shaft,
   (c) means for rotating said ring gear,
   (d) clutch means mounted on said shaft adjacent said ring gear including,
      (1) a body fixedly secured to said shaft,
      (2) a first arm secured to said body and extending substantially radially of said shaft,
      (3) a pinion rotatably mounted on said arm and engaging said ring gear,
      (4) a second arm extending substantially radially of said shaft and pivotally secured to said first arm,
      (5) a pinion rotatably mounted on said second arm engaging said first arm pinion and adapted to engage said ring gear to transmit rotary motion from said ring gear to said shaft,
      (6) spring means biasing said second arm pinion into engagement with said ring gear,
      (7) a third arm secured to said body and extending substantially radially of said shaft,
      (8) stop means engageable with said second arm to pivot said second arm with respect to said first arm and disengage said second arm pinion from said ring gear against the bias of said spring, and engageable with said third arm to stop the rotation of said clutch means and limit the rotation of said shaft to periods of engagement of said second arm pinion with said ring gear, and (9) means for intermittently actuating said stop means so as to periodically engage and disengage said clutch.

5. The invention set forth in claim 4 wherein said stop means includes a roller having portions of larger and smaller diameter, said larger diameter portions being engageable with said second arm and said smaller diameter portions being engageable with said third arm.

6. The invention set forth in claim 5 wherein said second and third arms are provided with arcuate camming surfaces engageable with said roller.

References Cited in the file of this patent

UNITED STATES PATENTS 2,752,022    Harper _____ June 26, 1956

FOREIGN PATENTS 308,495    Great Britain _____ Mar. 28, 1929